J. & G. H. BLISS.
Rotators for Ships' Logs.
No. 208,061.          Patented Sept. 17, 1878.
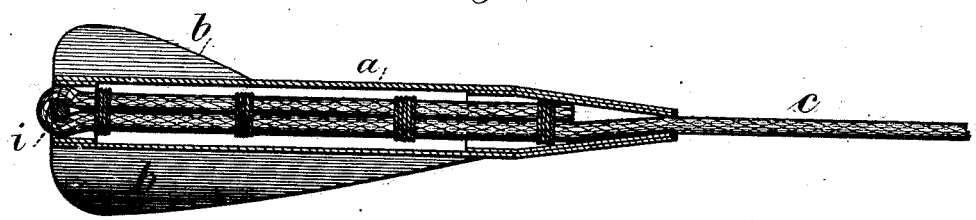
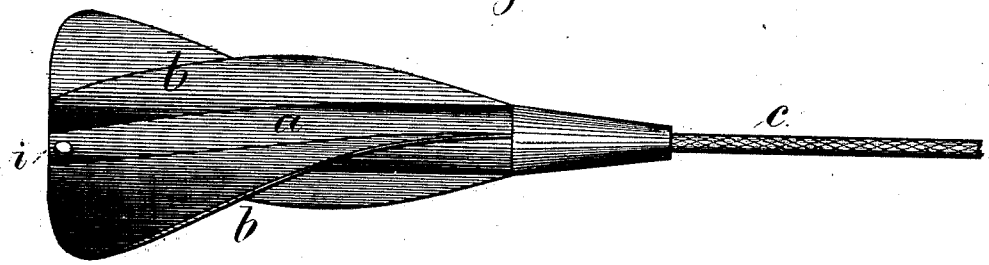

UNITED STATES PATENT OFFICE.

JOHN BLISS AND GEORGE H. BLISS, OF BROOKLYN, NEW YORK.

IMPROVEMENT IN ROTATORS FOR SHIPS' LOGS.

Specification forming part of Letters Patent No. 208,061, dated September 17, 1878; application filed January 17, 1878.

*To all whom it may concern:*

Be it known that we, JOHN BLISS and GEORGE H. BLISS, of Brooklyn, in the county of Kings and State of New York, have invented an Improvement in Rotators for Ships' Logs, of which the following is a specification:

Ships' logs have been made with rotators or propellers having fans attached spirally to a body, and the same have been dragged through the water by a line to a log at the ship, the registration being made by the revolution of the gearing upon the vessel, as may be seen in Letters Patent No. 178,261, granted to us.

In logs of this kind a difficulty has been experienced from sea-weed accumulating around the body of the rotator at the junction therewith of the blades in consequence of the angle formed at this point, or such accumulation has taken place at the eye to which the line is attached. This difficulty is avoided by making the rotator body and blades a gradual taper from the advancing point, so that there is no place for the weed to lodge.

In the drawing we have represented the rotator, in Figure 1, by a side view, and Fig. 2 is a longitudinal section, showing the manner of attaching the line.

The body $a$ of the rotator is tubular, the hole being entirely through the same. The front end is tapering, and the spiral wings or blades $b$ continue as a gradual taper to the place of greatest diameter, so as not to present any angle for the lodgment of sea-weed. The line $c$ is of braided strands, as shown, and the same is passed through the tubular body, folded back upon itself, and served around with cord, and the loop thus formed is drawn into the larger tubular rear end of the body $a$, and a pin or screw, $i$, is passed transversely across the body and through the loop, so as to secure the line in the most reliable manner.

We claim as our invention—

The rotator for ships' logs having a body with a tapering forward end, to which the line is connected, and spiral wings or blades that continue as a gradual taper from the tapering forward end of the body to the place of greatest diameter, substantially as set forth.

Signed by us this 3d day of January, A. D. 1878.

JOHN BLISS.
GEO. H. BLISS.

Witnesses:
JNO. J. LOUTH,
GEO. S. MCKIBBIN,
WALTER V. TRAVIS.